April 7, 1970  K. H. BECKER  3,505,523
PERSONNEL RADON DOSIMETER
Filed Aug. 2, 1968  2 Sheets-Sheet 1

INVENTOR.
Klaus H. Becker
BY
ATTORNEY.

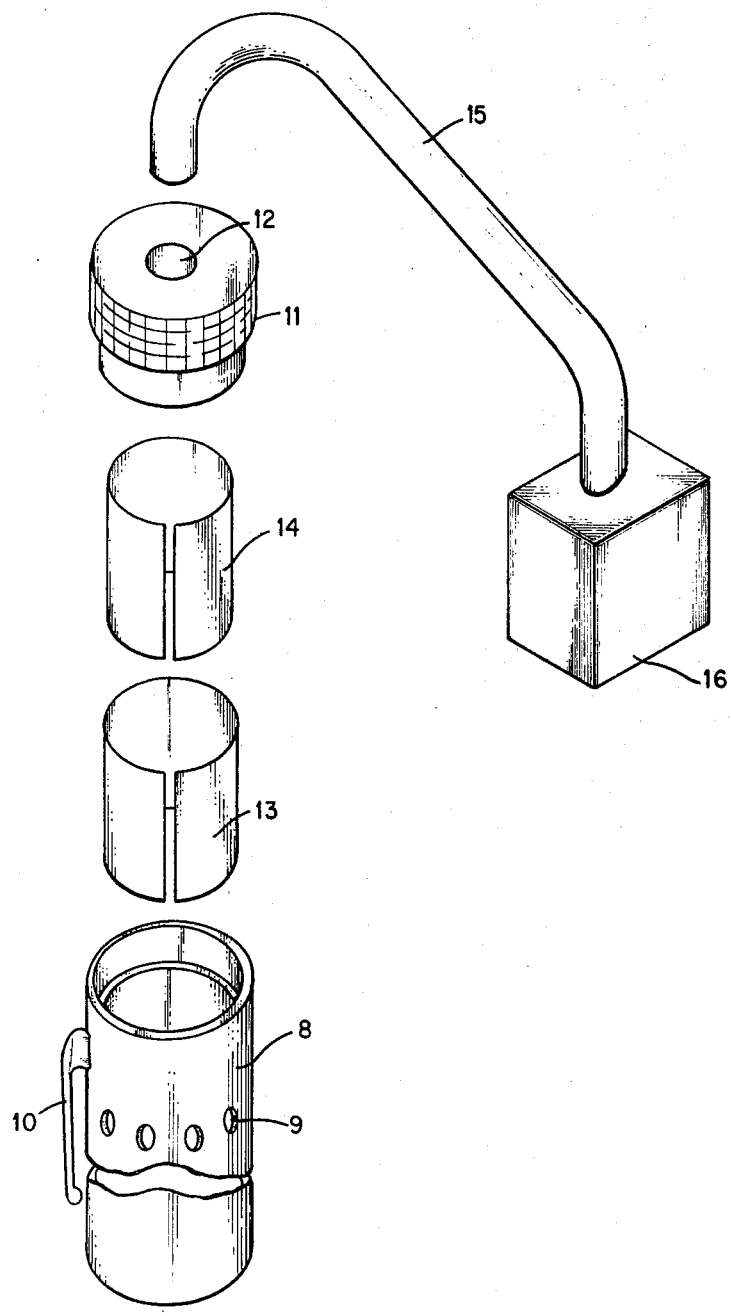

United States Patent Office 3,505,523
Patented Apr. 7, 1970

3,505,523
PERSONNEL RADON DOSIMETER
Klaus H. Becker, Oak Ridge, Tenn., assignor to the United States of America as represented by the United States Atomic Energy Commission
Filed Aug. 2, 1968, Ser. No. 749,725
Int. Cl. G01t 5/10
U.S. Cl. 250—83                 4 Claims

ABSTRACT OF THE DISCLOSURE

An organic polymer foil, such as cellulose triacetate, mounted within a holder and worn on a person has been found to be an efficient and accurate dosimeter for radon and its daughter products. This material is insensitive to light and sufficiently insensitive to temperature and humidity such that it may be used in uranium mines and other environments where these injurious agents may be present. Simple etching of alpha particle tracks which are registered in the foil makes them visible at low power magnification, and radiation dose may then be estimated by conventional or automatic track counting techniques.

BACKGROUND OF THE INVENTION

The present invention was made in the course of, or under, a contract with the U.S. Atomic Energy Commission.

The field of art to which the present invention pertains is for personnel dosimeters wherein the radiation dose received by a person wearing such a dosimeter can be detected and such a dose recorded by the dosimeter.

The most conventional method of determining dose due to radon and radon progeny is one which employs area monitoring stations. Samples are obtained by drawing air through a filter, and the alpha radiation is measured with conventional detectors. Some of these monitoring stations are at fixed locations; others are periodically moved through the area for a more complete sampling of the environment. This and other methods result in the determination of the average concentration and average dose, but do not accurately determine the dose to a specific worker, such as in a uranium mine, for the period of time he is in a potentially dangerous area. Actual concentrations may change considerably from one location to another due to various environmental factors.

A personnel radon dosimeter described in U.S. Patent No. 3,283,153 is adapted to be worn by a worker. The patented device utilizes a photographic nuclear track film held within a case that may be attached to clothing or the like. The film is covered with a light-opaque aluminized Mylar film which permits passage of alpha particles. Air which may contain radon and its daughters moves past the encased film by natural or forced circulation. Tracks in the emulsion caused by alpha particles are made visible by conventional photographic developing techniques. These tracks are then counted under a microscope, and the dose is computed based upon the number of tracks.

Although the film dosimeters potentially provide more accurate information regarding the dose received by a worker, there are several major disadvantages most of which are attributable to the film itself. The film is light-sensitive and thus must be protected from light until the developing process has been completed. Whatever encapsulation is used, a compromise must be made between opaqueness to light and transparency to alpha particles. Film is also sensitive to moisture, and the intentional high humidity in uranium mines or similar environments (to minimize dust) makes the usual life of the film only about 72 hours or less. Accordingly, film must be changed frequently in the dosimeters. Other ambient conditions, such as temperature, the presence of certain chemicals, etc., are also detrimental to the use of film both during use and after processing so that records are not as permanent as desired.

Some disadvantages exist in the processing of the film and the determination of the recorded information. Development time must be carefully controlled (under darkroom conditions) to optimize the development of the tracks without overdeveloping the general background (e.g., fogging from chemicals, gamma radiation, etc.) recorded on the film. Various imperfections and other marks not related to the alpha particles must be distinguished from the true alpha particle tracks by persons viewing the film in order to correctly determine the dose. At the required high magnifications, this is a difficult and tedious process and the reading cannot be conveniently automated. Therefore, the dose evaluation costs are high.

Thus there exists a need for a personal dosimeter utilizing other materials for the recording of alpha particles such that the disadvantage and limitation of the use of film, as discussed above, may be overcome. The present invention was conceived to meet this need in a manner to be discussed below.

SUMMARY OF THE INVENTION

In view of the disadvantages and limitations of the prior art, as mentioned above, it is the object of the present invention to provide a device and method for recording and measuring the radiation dose effected by radon and its daughter products which is essentially unaffected by light, by high humidity, and by temperature, and which is effective for recording alpha particles even in low densities.

The above object has been accomplished in the present invention by utilizing a cellulose derivative, such as cellulose triacetate, for example, as a recording medium for the alpha particles produced by radon and its daughters. It has been determined that cellulose-derivative foils are not affected by light, are essentially unaffected by high humidity, and are only slightly affected by temperatures approaching their softening point. Thus, essentially all of the disadvantages of the nuclear emulsion dosimeters are overcome. In addition, it should be noted that such cellulose-derivative foils are suitable recording media for alpha particles even in low track densities which could not effectively be achieved with the prior film dosimeters. Track detection of the cellulose-derivative foils is possible after subjecting the foils to a suitable etching solution, such as NaOH, KOH, $KMnO_4$, or $K_2Cr_2O_7$, for example, which makes the latent tracks in the foils visible. Continued etching increases the size of the etch pits, or holes, so that they are more readily observed at lower magnification. Since there are essentially no other markings on the foils similar to the etched pits, automatic reading, with a "flying spot scanner" or certain dark-field-microscopic techniques, for example, is possible for the rapid determination of dose.

BRIEF DESCRIPTION OF THE DRAWINGS

FIG. 2 is an exploded view of a second embodiment of the present invention.

DESCRIPTION OF THE PREFERRED EMBODIMENTS

Figure 1:
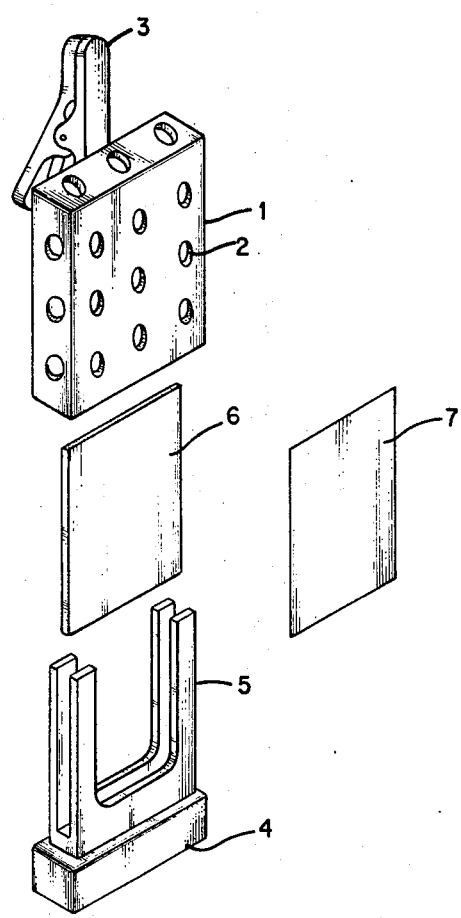
FIG. 1 is an exploded view of one embodiment of a personnel dosimeter for accomplishing the above object.

A personnel dosimeter containing an alpha-sensitive polymer foil of the present invention might have one of many forms. For example, its structure might be similar to that shown in the emulsion-type dosimeter of the above-mentioned U.S. Patent No. 3,283,153. Another possible structure is illustrated in FIG. 1 of the present drawings, wherein a hollow body member 1 is provided with a multiplicity of apertures 2 which communicate between the cavity of the body 1 and the external environment. The body 1 also may be provided with means, such as clip 3, for attaching the dosimeter to a worker's clothing. A base element 4 of the dosimeter has an upstanding forked support member 5 and its edges provide a friction fit with the surfaces of the cavity in the body member 1. A sheet 6 of cellulose triacetate, or other suitable alpha-sensitive polymer, is inserted into the forked support 5. One or more sheets 7 of a filter-like material may also be held in the support 5, adjacent to the sheet 6, to act as an absorber for aerosols, dust, etc. Examples of other suitable alpha-sensitive polymer foils that may be used in the device of FIG. 1 or FIG. 2, to be described below, include cellulose acetobutyrate, cellulose propionate, and polycarbonates of 4,9-dioxydiphenyl-2,2-propan. Also, cellulose nitrate may be used. However, because the latter, commercially available foils frequently have scratched surfaces and/or contain additives which may be resonsible for disturbing artifacts at the etched surface, suitable foils can be made by dissolving more or less nitrated cellulose in suitable solvents such as ethyl or amyl acetate and permitting slow evaporation of the solvent.

In the operation of the device of FIG. 1, air, radon gas, and aerosols containing radon progeny pass through the apertures 2 by convection and normal movement of the worker, and the alpha particles are registered on the polymer sheet 6. The filter-like material 7, if used, enhances the retention of the aerosol. After routine periods of using the dosimeter (weekly, for example) the polymer sheet 6 is removed for processing. It is etched in a warm solution of 30% KOH at 60° C. for a time between 1 minute and 2 hours, depending upon the material. The etched tracks of the alpha particles are then counted using an ordinary optical microscope or an appropriate automatic device such as electronic or mechanical scanning equipment. The number of alpha particle tracks provides a measure of the radioactive disintegrations and, subsequently, the radiation dose based on a calibration registration. The manner in which the calibration of the device can be determined will be discussed hereinbelow.

Another possible embodiment of a dosimeter of the present invention is illustrated in FIG. 2, wherein the body is a cylindrical tube 8 which is provided with radial apertures 9 and a clip 10. A removable cap 11, having an aperture 12, permits the insertion and removal of a polymer-type monitor foil 13. In some applications, one or more enhancing absorbers 14 may also be inserted within the foil 13. If desired, a tube 15 from a pump 16 may be connected to the aperture 12 to give greater sampling efficiency. In this case, the dosimeter can be designed in such a way that the radon daughter products which are attached to aerosol particles are collected at the surface of a filter. The plastic foil detector is fixed parallel to the surface of this filter in such a way that the alpha particles emitted from the radon daughter products are registered by the plastic. By the use of filters with different efficiency for particles of different size, it is possible to obtain additional information on the size distribution of the particles.

The feasibility of utilizing cellulose-derivative films for measuring the alpha particles resulting from the radiation decay of radon has been demonstrated. Air was bubbled through a solution containing $3.146 \times 10^{-7}$ grams of radium dissolved in approximately 20 ml. of dilute hydrochloric acid. The air was introduced through a glass frit at a rate of about 36 ml./min. After the extraction of radon gas, which builds up between experiments, the radon content of the air was regulated by the rate of radon production ($5.5 \times 10^{-8}$ Ci/day).

The air containing radon gas was passed through a glass wool bed to remove any droplets of solution and then passed into a desiccator. Alpha-particle detectors of various types were positioned in the central portion of the desiccator so that their distance from the walls was greater than the maximum range of the alpha particles. The gas flow rate was such that the radon at the detectors had an average "age" of four hours, thereby assuring an alpha activity equivalent to about 95% of the equilibrium value with all daughter products. Only a small portion of the original radon had decayed in this interval.

A Kodak NTA film, covered with aluminized Mylar of 6.3 micron thickness, exposed in the radon environment of the desiccator for approximately 64 hours, recorded (as observed) 48 tracks/mm.$^2$. The calibration factor for this emulsion is, therefore, about 0.7 tracks/mm.$^2$/pCi-hr./ml. A bare Triafol TN (made by Farbenfabriken Bayer AG, Leverkusen) cellulose triacetate foil was exposed to radon under the same conditions. After etching at 60° C. in 28% KOH for two hours, 20.5 tracks/mm.$^2$ were observed. The calibration factor is thus about 0.3 track/mm.$^2$/pCi-hr./ml., or about 40% of that of the NTA film.

Despite the smaller number of tracks, the counting of the cellulose triacetate foil was much faster and more convient than the film counting. Some background artifacts, unlike that in the film, were not easily confused with the alpha particle tracks, and the large etch pits in the foil could easily be seen at 100× magnification without changes in the focus; 400× magnification and frequent changing of the focus were required for the film reading.

The sensitivity of these foils is affected only to a minor extent, if at all, by high humidity or a high oxygen environment prior to or during use. A humidity greater than normal or certain chemical pre- or after-treatments of the foil, for example, submersion in a diluted $H_2O_2$ solution, however, speed the etching procedure. The latent tracks in the foil are only slightly affected by temperatures up to 60–100° C. The sensitivity of polymer foils can be increased by pre-irradiation to high gamma radiation doses. X-rays and beta radiation have the same effect.

On the basis of these results, one weekly maximum permissible concentration (MPC) would cause 100 track registration in a foil having a sensitive area of 3 cm.$^2$. Measurements would have a statistical accuracy of about ±10%.

It should be understood that the present invention is not restricted for use with the embodiments described above, since many other embodiments are possible to better meet local conditions. If, for example, it is desirable to distinguish between gaseous radon and solid daughter products produced exterior to the dosimeter, the air entering the dosimeter may be passed through a filter to trap the solid products. This filter may be kept at a distance such that alpha particles from the retained solids will not register on the detecting foil of the dosimeter.

This invention has been described by way of illustration rather than limitation and it should be apparent that it is equally applicable in fields other than those described.

What is claimed is:

1. A method for measuring the radiation dose effected by radon and its daughter products comprising the steps of pre-irradiating an organic polymer foil with non-track forming radiation and treating said foil with a substance selected from the group consisting essentially of water vapor, air, and $H_2O_2$; exposing said foil to said radon and its daughter products for recording of the alpha particle tracks effected thereby in said foil; etching said foil with an etching solution for making said tracks visible at low power magnification; and counting said tracks to provide an indication of the radiation dose, whereby said pre-irradiation and treatment steps respectively increase the sensitivity and etching speed of said foil.

2. The method set forth in claim 1, wherein said foil is selected from the group consisting essentially of cellulose nitrate, cellulose triacetate, cellulose propionate, and polycarbonates.

3. The method set forth in claim 2, wherein said etching solution is selected from the group consisting essentially of NaOH, KOH, $KMnO_4$, and $K_2Cr_2O_7$.

4. The method set forth in claim 3, wherein said selected etching solution is 30 percent KOH, and said etching step comprises etching said exposed foil at 60° C. for a selected time from 1 minute to 2 hours.

References Cited

UNITED STATES PATENTS

| | | | |
|---|---|---|---|
| 3,283,153 | 11/1966 | Geiger | 250—83 |
| 3,335,278 | 8/1967 | Price et al. | 250—83 X |
| 3,373,683 | 3/1968 | Alter | 250—83 X |

RALPH G. NILSON, Primary Examiner

D. L. WILLIS, Assistant Examiner